United States Patent [19]

Bernotavicz

[11] 4,247,562
[45] Jan. 27, 1981

[54] MOIST PET FOOD WITH BLOOD CHUNKS AND A FLUID GRAVY SYSTEM

[75] Inventor: John W. Bernotavicz, Hanover Park, Ill.

[73] Assignee: The Quaker Oats Company, Chicago, Ill.

[21] Appl. No.: 971,648

[22] Filed: Dec. 21, 1978

Related U.S. Application Data

[63] Continuation of Ser. No. 788,416, Apr. 18, 1977, abandoned, which is a continuation-in-part of Ser. No. 654,932, Feb. 3, 1976, abandoned.

[51] Int. Cl.³ .......................... A23L 1/31; A23K 1/04
[52] U.S. Cl. .................................. 426/72; 426/589; 426/647; 426/264; 426/805
[58] Field of Search ................ 426/72, 589, 647, 264, 426/250, 805, 249

[56] References Cited

U.S. PATENT DOCUMENTS

| | | | |
|---|---|---|---|
| 3,836,685 | 9/1974 | Schara et al. | 426/805 |
| 3,843,815 | 10/1974 | Reesman | 426/805 |

FOREIGN PATENT DOCUMENTS

| | | | |
|---|---|---|---|
| 9586 | of 1899 | United Kingdom | 426/642 |
| 1153135 | 5/1969 | United Kingdom | 426/805 |

*Primary Examiner*—Jeanette M. Hunter
*Attorney, Agent, or Firm*—Charles J. Hunter; Mathew R. P. Perrone, Jr.

[57] ABSTRACT

A canned food product for use with dry pet foods or to use alone is composed of a nutritionally fortified liquid gravy and blood based, retort stable, metal-like chunks.

9 Claims, No Drawings

MOIST PET FOOD WITH BLOOD CHUNKS AND A FLUID GRAVY SYSTEM

CROSS REFERENCE TO RELATED APPLICATIONS

This application is a continuation of U.S. Patent Application Ser. No. 788,416, filed Apr. 18, 1977, now abandoned which is a continuation-in-part of U.S. Application Ser. No. 654,932 filed Feb. 3, 1976 now abandoned.

BACKGROUND OF THE INVENTION

The invention relates to a food, and more particularly to a moist pet food comprising a mixture of a high moisture, vitamin- and mineral-fortified nutritional gravy and retort stable blood based chunks suitable for use as a top dressing for a dry pet food or to use along as a nutritional pet food.

Within the class of foods known as pet foods, there are three basic subdivisions, dry pet food, semi-moist pet food, and moist pet food. The moisture is determined by considering both the water present in the final product and the water combined with the various components that make up the final product. In general, the dry pet food—due to its low moisture content which is usually less than about 15 percent—tends to exhibit the greatest microbiological stability and requires no special handling or packaging after processing.

At the opposite end of the spectrum is the moist pet food having a moisture content in excess of about 50 percent. Due to the high moisture content of the moist pet food, microbiological stability is a major problem. This problem in a moist pet food is overcome only by heat sterilizing the moist pet food and packaging the moist pet food in a hermetically sealed container. Even with the heat sterilization and hermetically sealed package, refrigeration is required after the package of moist pet food is opened to preserve the leftover pet food for even a short time.

Semi-moist pet food has a moisture content generally ranging from about 15 percent to about 50 percent. Since semi-moist pet foods are higher in moisture content than dry and lower in moisture than canned, special techniques are required to render it microbiologically stable. This moisture content in combination with special techniques may produce a microbiologically stable food which does not require refrigeration. At the same time, the higher moisture content of the semi-moist pet food provides an increased palatability when compared to the dry pet food. The semi-moist pet food is generally rendered microbiologically stable by using high levels of sugar and solutes.

A typical formula of a dry pet food will show from 24 to 50 percent starch and/or starch-like materials; between 10 to 30 percent vegetable protein; 5 to 25 percent animal protein; 5 to 15 percent fat material; and 1 to 7 percent supplemental ingredients like vitamins, minerals, flavoring, coloring, antioxidants and other ingredients plus up to 15 percent moisture.

A dry pet food with its 10 percent moisture content is the most stable pet food and requires the least sophisticated processing and packaging techniques for stabilization. Dry pet foods typically have a hard, brittle, shell structure. While they can be highly nutritious, they also may not be nutritious and thus need a dressing (or an additive) to add essential vitamins and minerals. The dry pet foods also lack palatability. Such products are fed on an "as is" self-feeding basis in some kennels or are moistened with additives or dressings such as water, soups, gravies, or even moist all meat canned foods to increase palatability and consumption. Except for water, these additives are somewhat effective and may or may not be nutritional. A high moisture gravy, which is fortified with vitamins and minerals can further enhance nutrition and plalatability of a dry dog food if used as a top dressing. Additional improvements in texture, appearance, palatability and nourishment can result in the fortified gravy component if it is blended with retort stable meat-like pieces made predominantly from blood.

Blood contributes a high percentage of protein, and supplements the color, odor, flavor and nutrients of a canned pet food. It is a possible additive to gravy to form a moist pet food for use with other pet foods. However, when high levels (above 5%) of citrated or liquid blood are used, the moist pet food becomes a food with a dark, unappetizing color with a corresponding effect on odor and flavor. Furthermore, blood does not form stable meat-like chunks when simply added to a gravy and then retorted.

Thus, these detrimental features permit no high percentage usage of blood in commercial moist pet foods. Yet, blood is a readily available material. Due to this availability, it is an economical source of protein in ample supply. It is also palatable and has very little fat. If a means can be found for using greater quantities of blood in commercial moist pet foods, the advantages of blood can be put to their best use.

Even when sodium citrate or citric acid is added to fresh blood to prevent its coagulation, or blood is nitrated to hold its color, neither of these additions affects the protein content of blood. Blood averages about 17.6% protein and 81% water. This nutrient level compares very favorably with other meat or meat by-products used in pet food formulations. For example, the following ingredients show the following percentage of protein:

Pork lungs: 12.9% Protein Average;
Beef hearts: 13.6% Protein Average;
Beef spleens: 17.1% Protein Average;
Beef gullets: 12.5% Protein Average on an as is basis.

One variety of a moist pet food is the canned chunk and gravy type. This product may be used as a total diet for pets or used as a supplement for a pet's daily ration. Generally, the chunks in such a product are pieces of meat or formed pieces of a mixture of meat and cereal. Such canned products supply aroma, palatability and some added nutritional properties. The gravy portion usually has a fluid characteristic, and may be quite low in a number of essential nutrients for a pet's health. If a gravy with sufficient nutrients can be mixed with retort stable chunks made predominantly of blood, a nutritional improvement in the pet's diet can result. However for reasons described above, it is difficult to provide a meat-like chunk using only blood for use with a gravy to form a top dressing or to form a nutritious pet food alone.

SUMMARY OF THE INVENTION

It is therefore the object of this invention to provide a method for improving nutrition of a blood based pet food.

It is a further object of this invention to provide an enhanced nutritional composition for a pet food diet.

Yet a further object of this invention is to provide a composition which improves the palatability and acceptance of a pet food.

An additional object of this invention is to use the readily available blood source in a pet food.

A still further object of this invention is to provide a composition utilizing large amounts of blood.

Another object of this invention is to provide an improved gravy composition which maintains an appropriate and natural looking color.

Yet another object of this invention is to supplement nutrition of a dry pet food.

Still another object of this invention is to provide a composition which improves the palatability and acceptance of a dry pet food.

These and other objects of the invention are met by providing a moist pet food suitable for use alone or as a top dressing for other pet foods comprising a mixture of fortified gravy; and retort-stable, meat-like, chunks made predominantly from blood.

The objects of this invention can also be accomplished by providing a moist pet food comprising retort-stable blood-based meat-like chunks and a fluid gravy system wherein:

I. the blood-based, meat-like chunks consist essentially of from a trace to about 3 percent gum based on the weight of the chunk the balance of the chunk being blood;

II. the gravy system comprises:

(a) from a trace to 5.0 percent of a modified or unmodified starch or flour, or mixtures thereof;

(b) from 1 to 50 percent of a flavoring agent;

(c) sufficient vitamins and minerals to provide a nutritional pet food;

(d) from a trace to 7 percent of an edible oil or animal fat source;

(e) from a trace to 90 percent of water—all percentages of II. being based on the weight of the gravy mix; and III. the blood-based, meat-like chunks comprising 10 percent to 50 percent by weight of the pet food and the gravy system comprising from 50 to 90 percent and wherein the moist pet food is readily pourable.

The objects of this invention can further be accomplished by a process for making a moist pet food comprising retort-stable blood-based, meat-like chunks and a fluid gravy system comprising:

I. formulating a gravy system comprising:

(a) from a trace to 5.0 percent of a modified or unmodified starch or flour, or mixtures thereof;

(b) from 1.0 to 5.0 percent of a flavoring agent;

(c) sufficient vitamins and minerals to provide a nutritional pet food;

(d) from a trace to 7 percent of an edible oil or animal fat source;

(e) from a trace to 90 percent of water—all percentages of I. being based on the weight of the gravy system;

II. formulating a blood containing meat-like chunk by:

(a) adding to blood from a trace to 3 percent of at least one gum to form a mixture;

(b) solidifying the blood and gum mixture by heating the mixture until the mixture is coagulated;

(c) cooling the solidified blood;

(d) dividing the solidified blood into chunks; and (e) recovering the blood chunks;

III. admixing the gravy system with about 10 percent to 50 percent by weight chunks based on the weight of the food to form a mixture; and IV. retorting the mixture to form the food.

DESCRIPTION OF THE PREFERRED EMBODIMENTS

The present invention relates to a process for making a top dressing for pet foods composed of chunks made predominantly from blood and a flavorful, nutritional vitamin- and mineral-fortified gravy. These blood based chunks are added to the gravy to improve texture, nutrition and palatability.

The gravy comprises generally a liquid carrier, fats or oils, a thickening agent, and flavoring agents. The gravy is generally a fluid material. The consistency (thickness or thinness) of the gravy is controlled through the amount of thickening agent (usually modified food starch).

The flavor of the gravy is determined by the amount of natural or artificial food materials (e.g. meat, milk, fish, poultry, eggs, cheese by-products, etc) used in a formulation. These flavorings are used in amounts sufficient to impart the desired flavor. Flavoring materials may be such things as soup stocks like beef broth, chicken broth, artifical beef flavor, parmesan cheese, cheddar cheese with and without pizza flavor, dry yeast products such as torula yeast or brewers yeast, garlic, onion, fried onion flavor, or mixtures thereof. Further discussion of gravy is found in *Technical Bulletin No. 129* entitled "Sauces and Gravies" published by the Hubinger Co., Keokuk, Iowa. By "soup stock, beef broth or chicken broth" is meant any such canned broth or stock commercially available food known in the food trade. These flavoring materials can be used separately or in combination to range from 1 percent to 50 percent of the gravy formula by weight. It is preferably to use about 48 percent beef and/or chicken broth to improve the aroma, color and flavor of the specific beef or chicken flavor. A large number of artificial flavors or natural ingredients may be used in the gravy portion of the formula and are represented by such items as follows: beef, chicken, ham, smoke, tomato, pizza, fish, kidney, liver, egg, roast beef, roast pork, onion, onion dry powder, onion soup, garlic, salt, sugar or dry yeast products.

Other flavoring agents can be any suitable ingredients or mixtures thereof which imparts the desired favor to a gravy to help round out and balance the aroma and taste of such material.

A food thickening agent includes a modified or unmodified food starch or flour. By the term "modified food starch" is meant the use of thin-boiling (acid or oxidized treated) or thick-boiling regular grain, root or tuberous starch, high amylose corn starch or waxy maize or combinations thereof, either pregelatinized before, after, or distinct from the treatment with cross-linking agents such as sodium trimetaphosphate or phosphorous oxychloride alone or in conjunction with alkylating agents such as propylene oxide or acetylating agents such as acetic anhydrides. Within the gravy mix, at least one modified or unmodified food starch or food flour is used as the thickening agent. Typical characteristics of the modified food starch suitable for use in this invention include heat and shear stability, non-gummy characteristics, and non-retrogradability. Up to 5 percent of the modified food starch may be used. However, it is preferable to use about 3.5 percent to maintain the fluid nature of the gravy. One example of an unmodified food starch is the use of wheat flour in the gravy.

Up to about 7 percent of at least one edible oil or animal fat or mixtures thereof is also suitable for use in the gravy part of this invention. Up to about 5 percent of at least one edible oil or animal fat is more suitable for use in this invention. The oil or fat contributes to the overall richness and to the nutritional balance, consistency and flavor of the gravy. Typical oils for use in this invention include corn oil, cottonseed oil, peanut oil, sesame oil, and other blended and stabilized vegetable oils in addition to animal fats such as tallow, lard, suet, and choice white grease or mixtures of these oils or fats.

The liquid carrier used for the gravy is present in an amount sufficient to provide fluid characteristic to the gravy. Typically, water is used as the liquid carrier. The water may be added water or water derived from the components used in the gravy. The total water content of the gravy is up to about 90 percent by weight of the gravy. By total water content of the gravy is meant the added water plus any water used in the components of the gravy. The liquid gravy supplement is prepared so that it is readily pourable and maintains a good color and aroma connotation.

The liquid gravy may be further enriched by the addition of a vitamin-mineral mixture formulated to meet part (25 percent) to all (100 percent) of a pet's daily requirements as specified by the National Research Council for both dogs and cats. For example, a vitamin and mineral mixture prepared from Table I of the National Research Council's No. 8 "Nutrient Requirements of Dogs" revised 1974 can be also added to the gravy. For 15½ oz. can (300×407), it takes 1.375 grams of this prepared mixture to supply 25 percent NRC vitamin and mineral requirements; 2.75 grams to supply 50 percent and 5.5 grams to provide 100 percent of a dog's vitamins and minerals. The minerals include calcium, phosphorous, potassium, sodium chloride, magnesium, iron, copper, manganese, zinc, iodine and selenium. The vitamins include Vitamin A, Vitamin D, Vitamin E, Thiamin, Riboflavin, Pantothenic acid, Niacin, Pyridoxine, Folic Acid, Biocin, (Vitamin $B_{12}$), and Choline, Cats and other pets have nutrition determined in the same fashion.

The gravy may have additional ingredients such as milk solids, sugar, salt and emulsifiers, which aids in accentuating the flavor and appeal of a dry pet food or other pet food. An optional ingredient is edible food grade colorings. If coloring is used, up to about 1 percent by weight of any coloring may be added to the gravy. Typical colors (added for cosmetics) used to connote beef/or liver are caramel color. The exact level of addition varies with the desired color note.

Blood based, meat-like chunks used in his invention are gum-stabilized blood-chunks described in copending U.S. Patent Application Ser. No. 638,685 incorporated herein by reference, filed on Dec. 8, 1975 by the same inventor. Basically, Ser. No. 638,685 relates to forming of blood based chunks by dissolving a gum in liquid citrated or nitrated, fresh or frozen animal blood, heat setting the mixture, and then dicing the cooled coagulated mixture into the desired shape. Other additives may be incorporated into the blood based chunk too. In this manner, a unique, new type of meat-like chunk for incorporation in the gravy is disclosed. The gravy is further enhanced by incorporating a specific level (10-50 percent) of solid blood based chunks into a flavored gravy which has been fortified with from 25-100 percent of the pet's vitamin and mineral requirements as indicated by the National Research Council's recommendations. The chunks and gravy are prepared in two separate operations. While blood-based chunks may be added at levels from 10-50 percent of the top dressing, the preferred addition of blood based chunks to the gravy system is from 20-40 percent of the total. Correspondingly, the gravy system comprises 50-90 percent or more preferably 60-80 percent.

The retort-stable blood-based chunk is formed by mixing gum with the chunk and heating the mixure sufficiently to coagulate the blood and thereby solidify the mixture. For example, the mixture is heated in a water bath at temperatures from 150°-200° F. for 20 to 60 minutes or until the blood is adequately coagulated. The preferred time for heating is about 40 minutes at a temperature of about 180° F., but other times and temperatures may be used to coagulate the blood mixture. The cooled, coagulated blood is then divided into chunks.

By blood is meant the blood of slaughtered animals. Typical slaughtered animals include cattle, swine, sheep, goats, horses, whale and other mammals as well as poultry and fish. The preferred blood for use in this invention is beef blood, because of its availability (approximately 35 pounds of blood can be obtained from a 1000 pound steer). In this application, liquid blood usage varies depending on whether other food flavoring ingredients like cheese, meat and meat by-products, fish or just gum systems are used to produce a firm particle. The various types of blood are used singly or in any reasonable combination. In all cases, however, blood is the predominant ingredient used (or more than 50 percent is blood) to form this meat-like chunk.

Added to the above-referenced blood to form the desired solidified product is at least one gum. As the upper level of gum increases, the corresponding upper level of blood decreases. Such gum is generally present in an amount up to about 3 percent by weight of the blood. More preferably, the gum is present in an amount of 0.1 to 2 percent and even more preferably 0.2 to 0.8 percent by weight of the blood.

As above stated, the blood and gum are the only necessary elements for forming a solid blood chunk stable under moist pet food canning conditions. It is, however, possible to modify the meat-like blood chunk by adding other ingredients. When these other ingredients are added, the amount of blood in the chunk is correspondingly reduced, but in all cases the blood is more than 50 percent of the chunk based piece. These other ingredients are in the blood chunk when formed if added prior to solidifying the blood. Improved texture or improved nutrition of the solidified blood results when small amounts of at least one required gum are added to the blood together with these optional materials. When blood is solidified into a meat-like chunk with a firm stable texture by adding the gum with or without the optional ingredients, it can be added to many types of pet foods, e.g. as chunks in a canned pet food.

Typical gums suitable for use in this invention include the gums listed in U.S. Pat. No. 2,999,018 to Huffman, et al. More specifically, the gums can be one selected from the group consisting of xanthan gum, locust bean gum, agar agar, guar gum, sodium carboxymethylcellulose, carrageenan, alginate gums or any mixtures thereof.

The addition of the gums to the blood permits the addition of other ingredients to the blood in order to enhance and supplement the appearance, texture, flavor, odor, and nutritive properties of the resulting solidified blood particle. Other optional suitable ingredients which can be incorporated with the blood of this invention include at least one protein source, at least one amylaceous ingredient, at least one fat or oil, at least one vitamin or mineral supplement, various other additives selected from the group consisting of colorings, flavors, emulsifiers, antioxidants, and water absorbers, and mixtures thereof.

The additional and optional protein source which may be used up to 25 percent by weight can be animal or vegetable protein sources or mixtures thereof. Meats as a source of animal protein include the flesh of cattle, swine, sheep, goats, horses, whale and other mammals, poultry and fish. Another protein source is a meat by-product. By meat by-products is meant those things shown in the 1975 Association of American Feed Control Officials, Inc. under No. 9 Animal Products, 9.3 page 70 which says meat by-products are the non-rendered clean wholesome parts other than meat derived from slaughtered animals. Meat by-products include but are not limited to lungs, spleens, Kidneys, brains, livers, blood, bone, partially defatted fatty tissue using either a low temperature or a high temperature process, and stomachs and intestines freed of their contents. If it bears a name descriptive of its kind, it must correspond thereto, (Proposal 1973, Adopted 1974—NRC5-00-395).

Throughout the specification "up to" is construed as meaning that at least a trace amount of the named ingredient is present at the lower level.

After the meat-like blood chunks have been cooled to about room temperature, they are diced or cubed to an appropriate size and are placed into a can. For example, 4.65 ounces (30%) of blood-based chunks are added to a 300×407 can together with 10.85 ounces of a gravy system to form 15.5 ounces of a product after retorting. The blood-based chunks may be added to the can while they are either cooled or hot. When the blood chunks are diced while they are hot, a considerable quantity of broken and crumbled bits and pieces show up in the final product. A cleaner finished chunk and gravy can result by cubing the cooled meat-like chunks. In either case, a hot gravy solution (150°–200° F.) is poured over the chunks to produce a finished chunks and gravy blend. This procedure permits the blood-based chunks to warm up and allows untrapped gases to be expelled prior to the closing operation. These filled cans are vacuum closed and processed using commercially acceptable sterilization techniques.

In the following examples which are intended to illustrate without unduly limiting the invention, all parts and percentages are by weight unless otherwise specified.

EXAMPLE I

One process suggested to transform liquid citrated beef blood to a firm solid chunk is as follows.

At least one gum is added to liquid blood using adequate techniques to guarantee dispersion and prevent clumping by blending with other ingredients or with adequate agitation as shown below, such as a standard mixer:

(a)

99.2% Liquid citrated or nitrated or fresh beef blood
0.7% Xanthan gum (dry)
0.1% Calcium citrate (dry)

(b)

98.75–99.25% Liquid citrated or nitrated or fresh beef blood
0.75–1.25% Sodium carboxymethylcellulose (dry)

(c)

99.3% Liquid citrated or nitrated or fresh beef blood
0.7% Carrageenan gum (dry)

(d)

99.4% Liquid citrated or nitrated or fresh beef blood
0.3% Locust bean gum (dry) P0 0.3% Agar agar (dry)

In each case a suitable solid beef blood-based chunk is obtained upon properly cooking of each of the above mixtures. The large chunk can then be diced to form reddish-brown meat-like chunks.

EXAMPLE II

Example II illustrates the components of a beef gravy/or chicken gravy, formed in a standard fashion.

| A. Ingredient Composition | % | B. Ingredient Composition | % |
|---|---|---|---|
| Modified Food Starch | 3.50 | Modified Food Starch | 3.71 |
| Chicken/Beef Broth | 48.00 | Vegetable Oil | .33 |
| Vegetable Oil | .50 | Caramel Color | .10 |
| Caramel Color | .75 | Beef Broth | 47.93 |
| Vitamin-Mineral Mixture | 2.75 | Water Added | 47.62 |
| Condensed Onion Soup | 1.50 | Vitamin-Mineral Mix at 25% NRC | 0.31 |
| Water Added | 43.00 | | |
| | 100.00 | | 100.00 |

These percentages are based on the total of the above ingredients. Mixed with the diced blood based chunks of Example I, and retorted each of these gravies forms an acceptable top dressing. The blood-based chunks comprise 50 percent by weight of the top dressing.

EXAMPLE III

Example III shows other types of flavoring ingredients like commercial beef gravy mixes and artifical beef flavoring used at lower levels of approximately 5 percent and when mixed with 40 percent by weight of the blood-based chunks of Example I forms an acceptable top dressing.

| Ingredient Composition | % |
|---|---|
| Beef Gravy Mix | 4.35 |
| Wheat Feed Flour (thickener) | 1.50 |
| Modified Food Starch | 3.00 |
| Vegetable Oil or Animal Fat | .75 |
| Tomato Puree | 2.00 |
| Caramel Color | .35 |
| Water added | 86.80 |
| Vitiamin-Mineral Mix to supply 100% NRC requirement | 1.25 |
| | 100.00 | based on total of above ingredients.

EXAMPLE IV

Since gravy is a liquid, it lends itself to the incorporation of a variety of colors (to simulate such gravies as chicken, ham, cheese, pizza, white sauces) and permits the incorporation of numerous aromas and flavors as illustrated in Example IV A and IV B.

| A. | Yellow Cream Sauce- Ingredient Composition | % | B. | White Sauce- Ingredient Composition | % |
|---|---|---|---|---|---|
| | Cheddar Cheese | 4.68 | | Modified Food Starch | 3.53 |
| | Cheddar Cheese with Pizza | 4.68 | | Prime Steam Lard | 4.00 |
| | Parmesan Imitation Flavor | .0065 | | Skim Milk Powder | 2.80 |
| | Torula Yeast | .0650 | | Onion Powder | .67 |
| | Modified Food Starch | 1.290 | | Water | 88.10 |
| | Fried Onion flavor | .170 | | Suet | .90 |
| | Sugar | .161 | | | |
| | Tetrasodium Pyrophosphate | .0065 | | | |
| | Beef flavor | .6450 | | | |
| | Water added | 87.046 | | | |
| | Vitamin-Mineral Mix for 100% NRC | 1.25 | | | |
| | | 100.00 | | | 100.00 | based on total of above ingredients.

The gravy combined with the blood-based chunks of Example I is suitable as a top dressing on the dry pet food, such as those disclosed by Bone et al. in U.S. Pat. No. 3,883,672, or Mohrman et al. in U.S. Pat. No. 3,679,429.

EXAMPLE V

Additional examples of gravy using varying levels of the ingredients previously specified and including one example of a gravy without any added beef stock for flavor is shown in this Example V-A.

| A. | Ingredient Composition | % | B. | Ingredient Composition | % |
|---|---|---|---|---|---|
| | Beef Gravy Mix | 5.00 | | Modified Food Starch | 3.75 |
| | Wheat Feed Flour | 3.00 | | Tomato Paste | 3.5 |
| | Tomato Paste | 3.50 | | Aniamal Fat | 3.1 |
| | Modified Food Starch | 1.50 | | Wheat Feed Flour | 2.5 |
| | Vegetable Oil or Animal Fat | 1.25 | | Salt | 1.0 |
| | Caramel Color | .65 | | Sugar | 1.5 |
| | Onion Powder | .10 | | Onion Concentrate | .05 |
| | Water added | 84.35 | | Beef Broth | 44.35 |
| | Vitamin or Mineral Mix Added to supply 50% N.R.C. requirements | .65 | | Water Added | 40.25 |
| | | 100.00 | | | 100.00 | based on total of above ingredients.

Having thus fully disclosed and described this new and unique invention, what is claimed and sought to be secured by Letters Patent of the United States is as follows.

I claim:

1. A moist pet food comprising retortable blood-based, meat-like chunks and a fluid gravy system wherein:
   I. the blood-based, meat-like chunks consist essentially of from 0.1 to about 3 percent gum selected from the group consisting of xanthan gum, locust bean gum, carboxy methycellulose and a carrageenan product based on the weight of the chunk, the balance of the chunk being blood;
   II. the gravy system consisting essentially of:
      (a) from a trace to 5.0 percent of a modified or unmodified starch or flour, or mixtures thereof;
      (b) from 1 to 50 percent of a flavoring agent;
      (c) a nutritional amount of vitamins and minerals;
      (d) from a trace to 7 percent of an edible oil or animal fat source;
      (e) the balance of the gravy system being water in an amount from a trace to 90 percent of water—all percentages of II. being based on the weight of the gravy mix;
   said moist pet food comprising 10 percent to 50 percent by weight of the blood-based, meat-like chunks and from 50 percent to 90 percent of the gravy system said pet food being readily pourable.

2. The moist pet food of claim 1 mixed with a dry pet food to thereby improve nutrition and palatability.

3. The moist pet food of claim 1 wherein the flour in the gravy system comprises from a trace to 5 percent wheat flour by weight of the gravy system.

4. The moist pet food of claim 1 wherein the modified food starch comprises 3.5 percent by weight of the gravy system.

5. The moist pet food of claim 4 wherein the oil or fat is present up to about 5 percent by weight of the gravy system.

6. The moist pet food of claim 5 wherein the blood-based chunks comprises 20 to 40 percent by weight of the moist pet food.

7. The moist pet food of claim 1 wherein the flavoring agent for the gravy comprises 1 percent to 50 percent beef broth, chicken broth, soup stock or mixtures thereof by weight of the gravy system.

8. A process for making a moist pet food comprising:
   I. formulating a gravy system comprising:
      (a) from a trace to 5.0 percent of a modified or unmodified starch or flour, or mixtures thereof;
      (b) from 1.0 to 50 percent of a flavoring agent;
      (c) sufficient vitamins and minerals to provide a nutritional pet food;
      (d) from a trace to 7 percent of an edible oil or animal fat source;
      (e) the balance of the gravy system being water in an amount from a trace to 90 percent of water—all percentages of I. being based on the weight of the gravy system;
   II. formulating a blood containing meat-like chunk by:
      (a) adding to blood from 0.1 to 3 percent of at least one gum selected from the group consisting of xanthan gum, locust bean gum, carboxy methycellulose and a carrageenan product to form a mixture;
      (b) solidifying the blood and gum mixture by heating the mixture until the mixture is coagulated;
      (c) cooling the solidified blood;
      (d) dividing the solidified blood into chunks; and
      (e) recovering the blood chunks;
   III. admixing the gravy system with about 10 percent to 50 percent by weight chunks based on the weight of the food to form a mixture; and
   IV. retorting the mixture to form the food.

9. A process for making a moist pet food, as recited in claim 8, wherein the blood and gum mixture of step II. (b) is coagulated by heating the mixture to a temperature between 150° to 200° F.

* * * * *